(12) United States Patent
Wang et al.

(10) Patent No.: US 10,431,913 B1
(45) Date of Patent: Oct. 1, 2019

(54) FLOATING DIRECTIONAL SUPPORT OF ELECTRONIC COMPONENT

(71) Applicant: HONGFUJIN PRECISION ELECTRONICS (TIANJIN) CO., LTD., Tianjin (CN)

(72) Inventors: Nan-Chieh Wang, New Taipei (TW); Wen-Chen Wang, New Taipei (TW)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 0 days.

(21) Appl. No.: 16/162,392

(22) Filed: Oct. 17, 2018

(30) Foreign Application Priority Data

Aug. 10, 2018 (CN) .......................... 2018 1 0914359

(51) Int. Cl.
*H01R 12/71* (2011.01)
*H01R 13/422* (2006.01)
*G06F 1/18* (2006.01)

(52) U.S. Cl.
CPC ........... *H01R 12/716* (2013.01); *G06F 1/188* (2013.01); *H01R 13/422* (2013.01)

(58) Field of Classification Search
CPC ...... H01R 12/716; H01R 13/422; G06F 1/188
USPC ................. 439/55, 260, 65, 377, 162, 607.5
See application file for complete search history.

(56) References Cited

U.S. PATENT DOCUMENTS

| | | | | |
|---|---|---|---|---|
| 5,980,290 A * | 11/1999 | Meynier | ............ | H01R 13/6315 439/246 |
| 6,079,986 A * | 6/2000 | Beshears | ................ | H01R 24/50 439/63 |
| 6,129,554 A * | 10/2000 | Poth | ........................ | H01R 13/53 439/246 |
| 6,497,579 B1 * | 12/2002 | Garbini | .............. | H01R 13/6315 439/246 |
| 6,520,785 B2 * | 2/2003 | Hida | ...................... | H01R 24/46 200/51.09 |
| 6,827,608 B2 * | 12/2004 | Hall | .................... | H01R 13/6315 439/578 |
| 7,112,078 B2 * | 9/2006 | Czikora | ............. | H01R 13/6315 439/248 |
| 7,210,941 B2 * | 5/2007 | Rosenberge | ....... | H01R 13/2464 439/63 |
| 7,478,475 B2 * | 1/2009 | Hall | ..................... | H01R 24/542 29/828 |
| 7,740,488 B2 * | 6/2010 | Taylor | .................. | H01R 12/714 439/66 |
| 8,323,058 B2 * | 12/2012 | Flaherty | ............. | H01R 13/6277 439/680 |
| 8,605,458 B2 * | 12/2013 | Liu | .................... | H01R 13/6315 361/809 |
| 8,734,167 B2 * | 5/2014 | Aimoto | ................ | H01R 13/187 439/74 |

(Continued)

*Primary Examiner* — Tulsidas C Patel
*Assistant Examiner* — Peter G Leigh
(74) *Attorney, Agent, or Firm* — ScienBiziP, P.C.

(57) ABSTRACT

A floating directional support for adjusting a gap between a connecting plate and a joint substrate is provided. The connecting plate is mounted on a substrate. The floating directional support includes a base coupled to the substrate and an insertion member coupled to the connecting plate. The insertion member is movably coupled to the base. The gap between the connecting plate and the substrate is adjusted by moving the insertion member relative to the base.

15 Claims, 9 Drawing Sheets

(56) References Cited

U.S. PATENT DOCUMENTS

| | | | | |
|---|---|---|---|---|
| 9,039,433 | B2* | 5/2015 | Barthelmes | H01R 13/629 |
| | | | | 439/248 |
| 9,281,641 | B2* | 3/2016 | Baechle | H01R 12/716 |
| 9,614,309 | B1* | 4/2017 | Miklinski, Jr. | H01R 13/04 |
| 9,735,531 | B2* | 8/2017 | Zhu | H01R 24/542 |
| 2006/0228922 | A1* | 10/2006 | Morriss | H01R 12/62 |
| | | | | 439/171 |
| 2011/0237123 | A1* | 9/2011 | Burris | H01R 13/6277 |
| | | | | 439/578 |
| 2014/0273551 | A1* | 9/2014 | Resendez | H01R 12/737 |
| | | | | 439/65 |
| 2018/0198222 | A1* | 7/2018 | Washino | H01R 12/91 |
| 2018/0301837 | A1* | 10/2018 | Hoyack | H01R 12/7082 |

\* cited by examiner

FLOATING DIRECTIONAL SUPPORT OF ELECTRONIC COMPONENT

FIELD

The subject matter herein generally relates to power supplies, and more particularly to a power supply for an electronic device.

BACKGROUND

Generally, electronic components include a plurality of circuit boards. The circuit boards are connected to each other by connectors to establish signal communication between circuit boards. A gap having a predetermined size is required between circuit boards. If the gap is too big, a wipe length of the connectors is decreased. If the gap is too small, pins of the connectors may be deformed.

Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
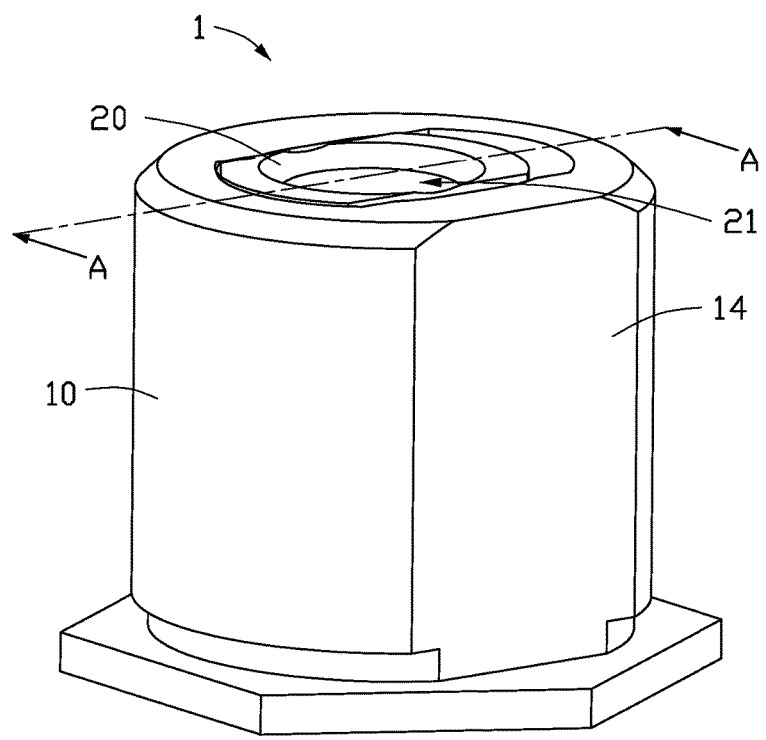
FIG. 1 is an assembled, isometric view of an embodiment of a floating directional support.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
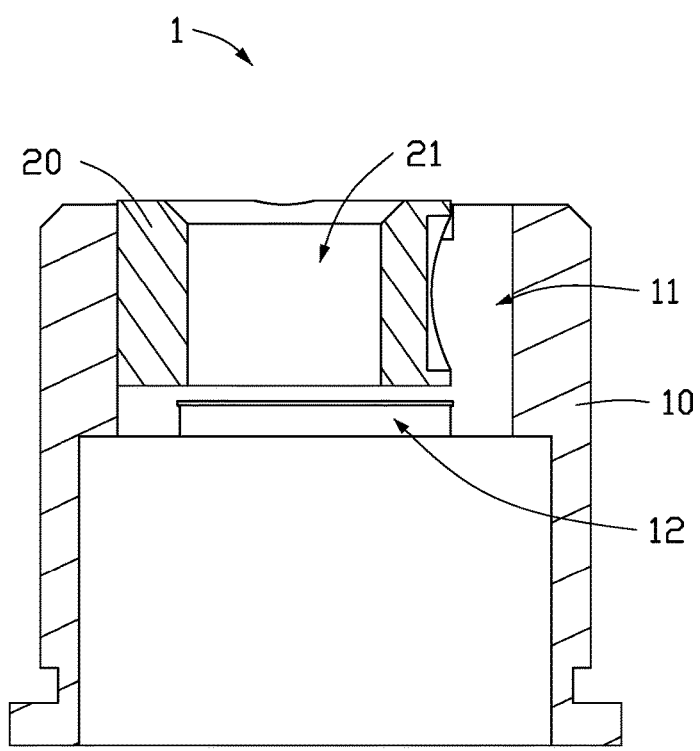
FIG. 2 is a cross-sectional view of the floating directional support in FIG. 1 taken along line A-A.

FIG. 1 and FIG. 2 show a first embodiment of a floating directional support 1. The floating directional support 1 includes a base 10 and an insertion member 20. The insertion member 20 is movably coupled to the base 10.

Figure 3:
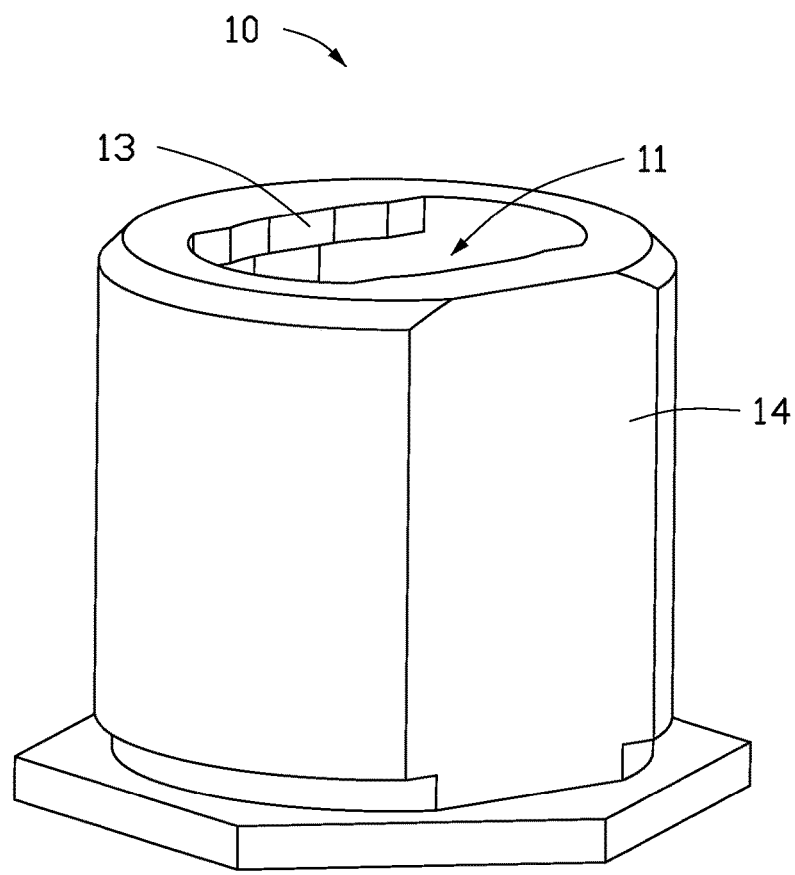
FIG. 3 is an isometric view of a base of the floating directional support in FIG. 1.

FIG. 3 shows a structure of the base 10. The base 10 is substantially a hollow column. An outer wall of the base 10 forms a first guiding surface 14. The first guiding surface 14 is substantially parallel to an axis of the base 10 and extends along a direction of movement of the insertion member 20. The base 10 defines a receiving cavity 11 through an end portion of the base 10 for receiving the insertion member 20. The base 10 includes at least one first boss 13 and at least one second boss 12. The first boss 13 is formed at one end of the receiving cavity 11. The second boss 12 is formed at an opposite end of the receiving cavity 11. The first boss 13 and the second boss 12 extend along a radial direction of the receiving cavity 11 and protrude from an inner wall of the receiving cavity 11. The first boss 13 and the second boss 12 cooperatively define a guiding channel (not labeled) therebetween that extends along a radial direction of the receiving cavity 11.

In one embodiment, the radial direction of the receiving cavity 11 includes a long axial direction and a short axial direction. By use of "long" and "short", it is not the absolute lengths of the directions that is being referred to. Rather, the long axial direction is longer than the short axial direction. Thus, a shape of a cross-section of the receiving cavity 11 may be elliptical, rectangular, or other elongated shape. The long axial direction extends along a length of the receiving cavity 11. The guiding channel defined between the first boss 13 and the second boss 12 extends along the long axial direction.

Figure 4:
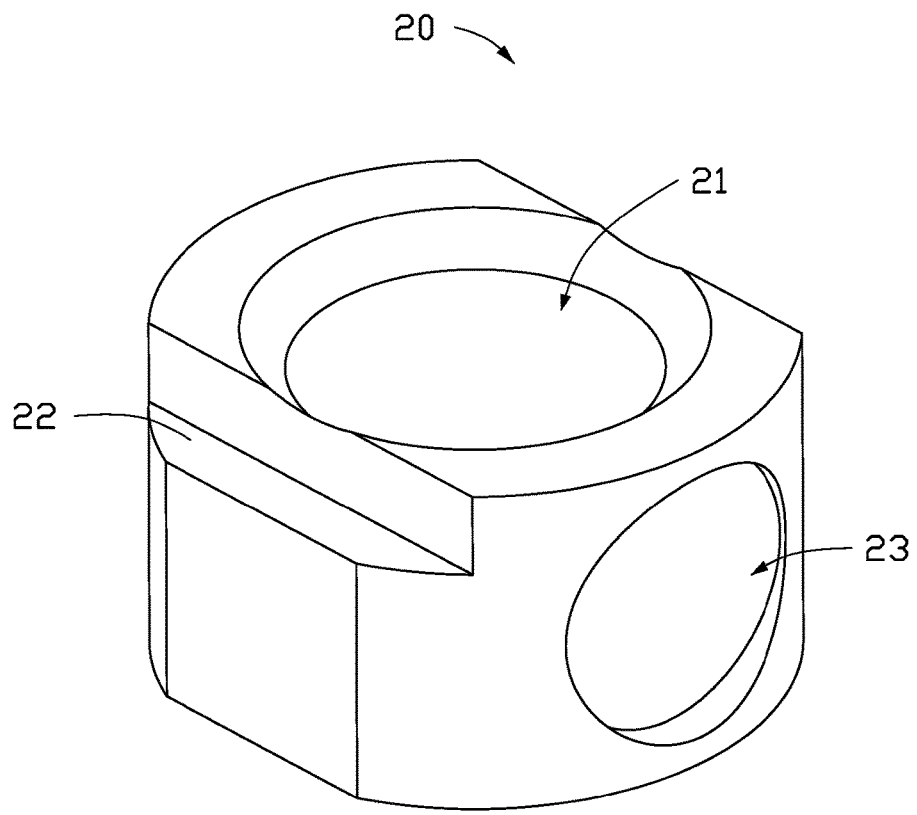
FIG. 4 is an isometric view of an insertion member of the floating directional support in FIG. 1.

FIG. 4 shows a structure of the insertion member 20. An upper end surface of the insertion member 20 forms a step 22 corresponding to the first boss 13. In one embodiment, the insertion member 20 is received within the receiving cavity 11 between the first boss 13 and the second boss 12 such that the step 22 abuts the first boss 13, and a lower end surface of the insertion member 20 abuts the second boss 12. Thus, the insertion member 20 can move back and forth along the guiding channel defined between the first boss 13 and the second boss 12 within the receiving cavity 11. In one embodiment, the insertion member 20 defines a threaded hole 21 for receiving an attachment member (such as a screw) to couple to another component.

Figure 5:
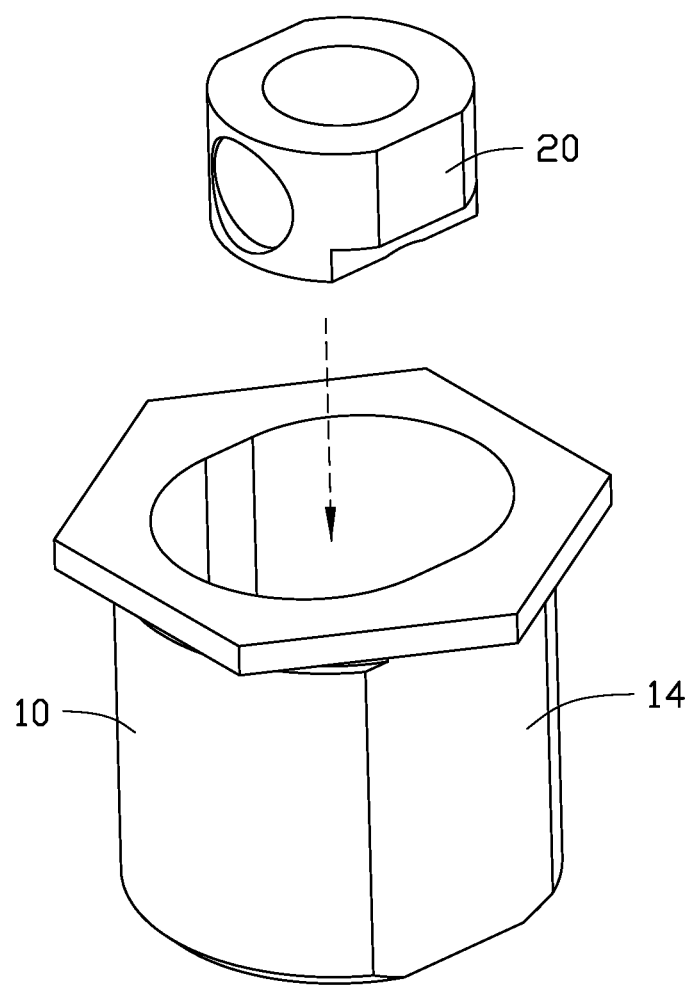
FIG. 5 is an exploded, isometric view of the base and the insertion member of the floating directional support in FIG. 1 showing assembly of the floating directional support.

FIG. 5 shows an assembled floating directional support 1. The insertion member 20 is inserted into the receiving cavity 11 along the axial direction of the receiving cavity 11 until the step 22 of the insertion member 20 abuts the first boss 13. Thus, the insertion member 20 is positioned between the first boss 13 and the second boss 12 and can move along the guiding channel defined between the first boss 13 and the second boss 12.

In one embodiment, after the insertion member 20 is received between the first boss 13 and the second boss 12, the second boss 12 may be pressed or stamped to deform the second boss 12 to cause the second boss 12 to be press-fitted to the end surface of the insertion member 20 facing the second boss 12, thereby fixing the insertion member 20 within the receiving cavity 11.

Figure 6:
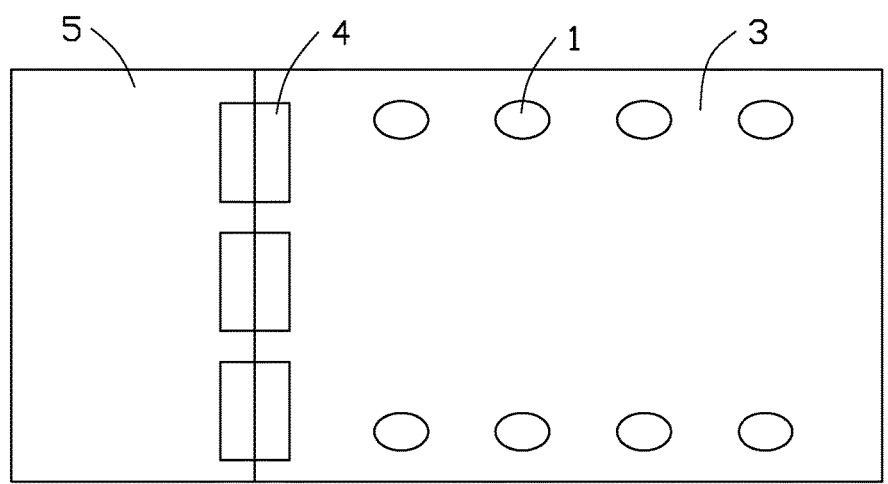
FIG. 6 is a top view of an electronic component having a plurality of the floating directional supports in FIG. 1.
Figure 7:
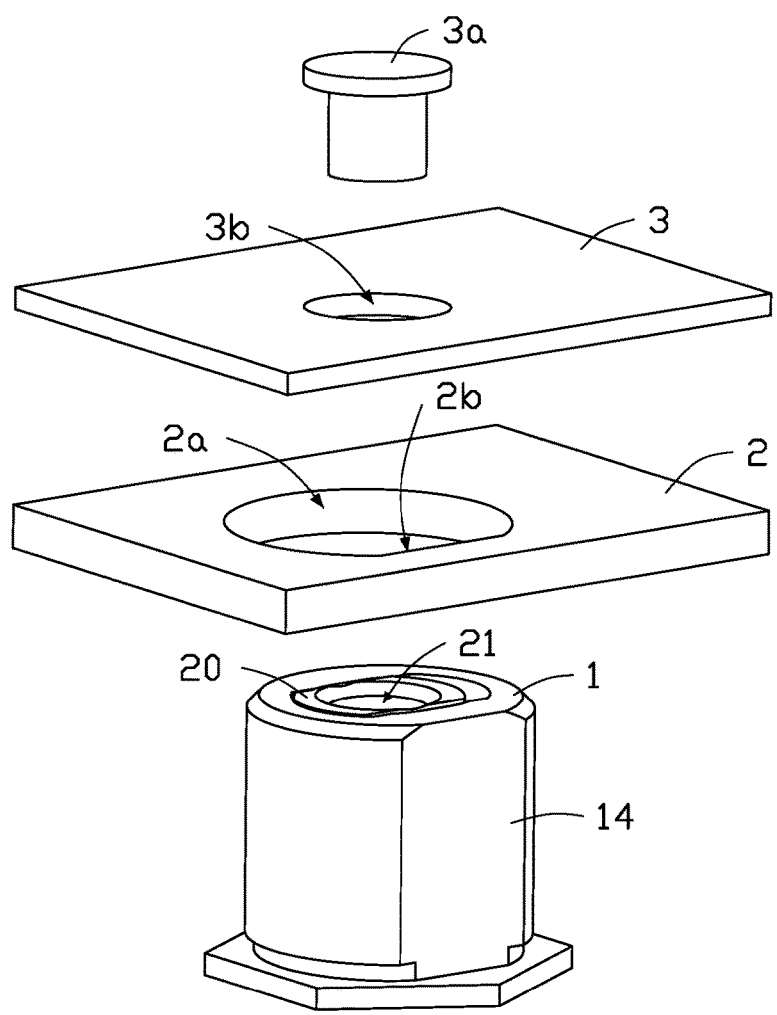
FIG. 7 is a partial, isometric view of the electronic component in FIG. 5.

FIG. 6 and FIG. 7 show an embodiment of the floating directional support 1 used in an electronic component. The electronic component includes a substrate 2, a connecting plate 3, a joint substrate 5, and a plurality of the floating directional supports 1. In one embodiment, the substrate 2 is a side panel of a chassis of the electronic component. In another embodiment, the substrate 2 is a circuit board. The connecting plate 3 coupled to the substrate 2 by the plurality of floating directional supports 1.

In one embodiment, the connecting plate 3 and the joint substrate 5 are both circuit boards. Each of the connecting plate 3 and the joint substrate 5 include connectors 4 for establishing signal communication between the connecting plate 3 and the joint substrate 5. The connectors 4 include male connectors and female connectors. To ensure reliability and stability of the connectors 4, the connecting plate 3 is required to be positioned relative to the joint substrate 5 to ensure an adequate wipe length of pins of the connectors 4 while avoiding deformation of the pins of the connectors 4. In one embodiment, the wipe length refers to a length of pins of the male connector inserted into the corresponding female connector.

The substrate 2 is coupled to the base 10 of the floating directional supports 1, and the connecting plate 3 is coupled to the insertion members 20. Because the insertion members 20 can move relative to the corresponding bases 10, the connecting plate 3 can move relative to the substrate 2 to adjust the gap between the connecting plate 3 and the joint plate 5, thereby adjusting a connection between the corresponding connectors 4.

FIG. 7 shows the assembly of the floating directional support 1, the connecting plate 3, and the substrate 2 of the electronic component in FIG. 6. The first guiding surface 14 extends along the radial direction of movement of the insertion member 20, and the first guiding surface 14 is substantially parallel to the guiding channel defined between the first boss 13 and the second boss 12. A first mounting hole 2a is defined through the substrate 2. An inner wall of the first mounting hole 2a forms a second guiding surface 2b corresponding to the first guiding surface 14.

The base 10 of the floating directional support 1 is received through the first mounting hole 2a to attach the base 10 to the substrate 2. The connecting plate 3 defines a second mounting hole 3b. In one embodiment, the connecting plate 3 is attached to the insertion member 20 by a screw 3a passing through the second mounting hole 3b, the first mounting hole 2a, and screwed into the threaded hole 21 defined in the insertion member 20. In one embodiment, a height of the insertion member 20 is greater than a height of the base 10 to cause the insertion member 20 to partially extend out of the base 10, so that the base 10 does not contact the connecting plate 3 when the connecting plate 3 is moved.

In assembly of the electronic component, the insertion members 20 are inserted into the bases 10 of the floating directional supports 1. In particular, the insertion member 20 is inserted into the receiving cavity 11 of the base 10 along the axial direction of the base 10 until the step 22 of the insertion member 20 abuts the first boss 13, and the insertion member 20 is positioned between the first boss 13 and the second boss 12.

The substrate 2 is coupled to the base 10, and the connecting plate 3 is coupled to the insertion member 20. In one embodiment, the first guiding surface 14 of the base 10 faces the second guiding surface 2b of the first mounting hole 2a of the substrate 2, thereby fixing the direction of movement of the insertion member 20. When the base 10 is coupled to the substrate 2, the first guiding surface 14 is parallel to and abuts the second guiding surface 2b, thereby preventing the base 10 from rotating relative to the substrate 2. The connecting plate 3 is attached to the insertion member 20 by a connecting member (such as the screw 3a).

Because the insertion member 20 can move relative to the base 10, the connecting plate 3 attached to the insertion member 20 can be moved to adjust the gap between the connecting plate 3 and the joint substrate 5, thereby adjusting the connecting between the corresponding connectors 4.

Figure 8:
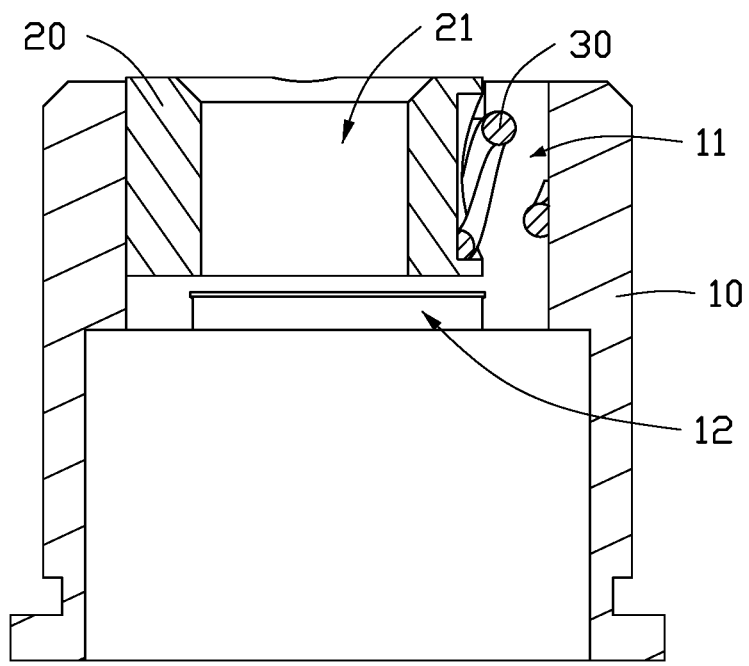
FIG. 8 is a cross-sectional view of a second embodiment of the floating directional support.
Figure 9:
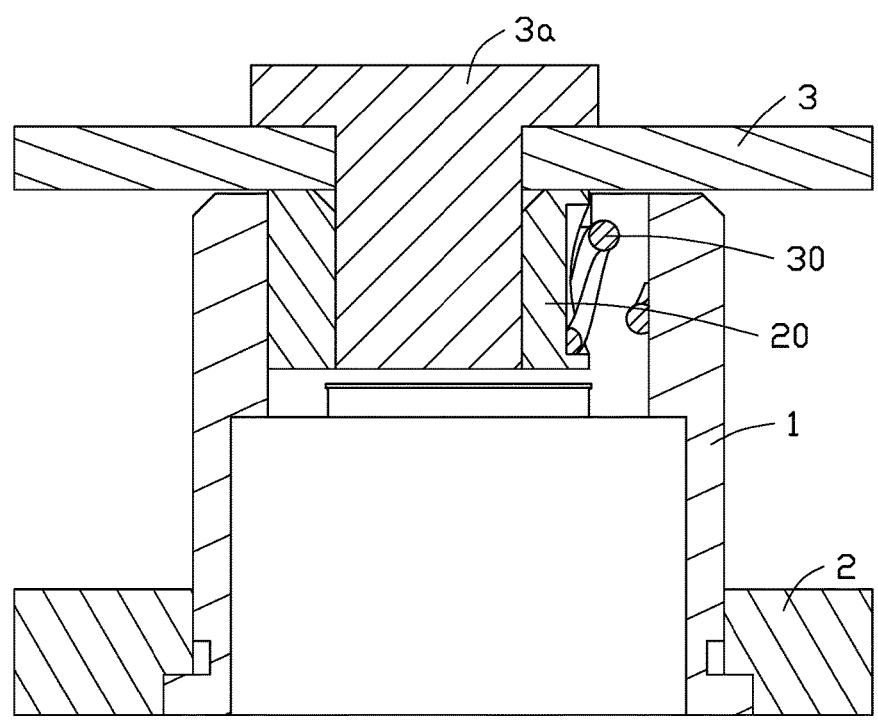
FIG. 9 is a cross-sectional view of the second embodiment of the floating directional support mounted in the electronic component.

FIG. 8 and FIG. 9 show a second embodiment of the floating directional support 1. The second embodiment is similar to the first embodiment, except that the floating direction support 1 further includes a resilient member 30.

The resilient member 30 may be a spring or other high polymer material. The spring 30 is located between the insertion member 20 and the base 10 along the radial direction of movement of the insertion member 20 within the base 10. One end of the spring 30 is attached to an inner wall of the base 10, and the other end of the spring 30 is attached to a side of the insertion member 20. In an original position, the resilient member 30 is not elastically deformed. When the insertion member 20 is moved along the radial direction within the base 10 to adjust the gap between the connecting plate 3 and the joint substrate 5, the resilient member 30 is elastically deformed, and a restoring force of the resilient member 30 restores a position of the insertion member 20 within the base 10. Thus, after the insertion member 20 is moved, the resilient member 30 moves the insertion member 20 back to the original position.

In at least one embodiment, after the insertion member 20 is inserted within the receiving cavity 11, the second boss 12 is deformed by stamping or pressing to press-fit the second boss 12 to the end surface of the insertion member 20, thereby fixing the insertion member 20 and the resilient member 30 between the first boss 13 and the second boss 12.

The electronic component using the plurality of floating directional supports 1 provide convenient positioning of the connecting plate 3 relative to the joint substrate 5. Since the insertion member 20 is movably received within the base 10 to adjust the position of the connecting plate 3 relative to the joint substrate 5, a plurality of separate resilient members are not required to be provided between the substrate 2 and the connecting plate 3 to adjust the position of the connecting plate 3. Thus, a size of the electronic component is reduced.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A floating directional support for adjusting a gap between a connecting plate and a joint substrate, the connecting plate mounted on a substrate, the floating directional support comprising:
    a base coupled to the substrate; and
    an insertion member coupled to the connecting plate and movably coupled to the base; wherein:
    the gap between the connecting plate and the substrate is adjusted by moving the insertion member relative to the base;
    the base defines a receiving cavity extending in a radial direction within the base; and
    the insertion member is movably received along the radial direction within the receiving cavity.

2. The floating directional support of claim 1, wherein:
    the receiving cavity is an elliptical columnar cavity; and
    the radial direction within the receiving cavity is defined along a longest axial direction of a cross-section of the elliptical columnar cavity.

3. The floating directional support of claim 1, further comprising a resilient member, wherein:
    the resilient member is located between the insertion member and the base along a direction of movement of the insertion member within the base;
    when the insertion member moves to adjust the gap between the connecting plate and the joint substrate, the resilient member is elastically deformed, and a restoring force of the resilient member restores a position of the insertion member within the base.

4. The floating directional support of claim 1, wherein:
    the base comprises a first boss and a second boss within the receiving cavity;
    the first boss and the second boss are located at opposite ends of the receiving cavity; and
    the insertion member is positioned between the first boss and the second boss.

5. The floating directional support of claim 4, wherein:
    an end portion of the insertion member forms a step configured to abut the first boss; and
    the insertion member partially extends out of the base.

6. The floating directional support of claim 1, wherein the insertion member defines a threaded hole for coupling to the connecting plate.

7. The floating directional support of claim 1, wherein the connecting plate and the joint substrate each comprise a plurality of connectors to establish signal communication between the connecting plate and the joint substrate.

8. An electronic component comprising:
    a substrate;
    a connecting plate mounted on the substrate; and
    a plurality of floating directional supports for adjusting a gap between the connecting plate and a joint substrate, each of the plurality of directional supports comprising:
    a base coupled to the substrate; and
    an insertion member coupled to the connecting plate and movably coupled to the base; wherein:
    the gap between the connecting plate and the substrate is adjusted by moving the insertion member relative to the base.

9. The electronic component of claim 8, wherein:
    the base defines a receiving cavity extending in a radial direction within the base; and
    the insertion member is movably received along the radial direction within the receiving cavity.

10. The electronic component of claim 9, wherein:
    the receiving cavity is an elliptical columnar cavity; and
    the radial direction within the receiving cavity is defined along a longest axial direction of a cross-section of the elliptical columnar cavity.

11. The electronic component of claim 9, wherein:
    the base comprises a first boss and a second boss within the receiving cavity;
    the first boss and the second boss are located at opposite ends of the receiving cavity; and
    the insertion member is positioned between the first boss and the second boss.

12. The electronic component of claim 11, wherein:
    an end portion of the insertion member forms a step configured to abut the first boss; and
    the insertion member partially extends out of the base.

13. The electronic component of claim 8, further comprising a resilient member, wherein:
    the resilient member is located between the insertion member and the base along a direction of movement of the insertion member within the base;
    when the insertion member moves to adjust the gap between the connecting plate and the joint substrate, the resilient member is elastically deformed, and a restoring force of the resilient member restores a position of the insertion member within the base.

14. The electronic component of claim 8, wherein the insertion member defines a threaded hole for coupling to the connecting plate.

15. The electronic component of claim 8, wherein the connecting plate and the joint substrate each comprise a plurality of connectors to establish signal communication between the connecting plate and the joint substrate.

* * * * *